United States Patent [19]

Takayanagi et al.

[11] 4,228,218
[45] Oct. 14, 1980

[54] POLYMER COMPOSITE MATERIAL

[75] Inventors: Motowo Takayanagi, No. 20-20, Chuokutani 2-chome, Fukuoka-shi, Fukuoka, Japan; Tisato Kajiyama, Fukuoka, Japan

[73] Assignees: Motowo Takayanagi, Fukuoka; Asahi Kasei Kogyo Kabushiki Kaisha, Osaka, both of Japan

[21] Appl. No.: 958,324

[22] Filed: Nov. 6, 1978

[30] Foreign Application Priority Data

Nov. 4, 1977 [JP] Japan .................................. 52-131436

[51] Int. Cl.³ ........................ B32B 9/04; B32B 27/08; B32B 27/40
[52] U.S. Cl. ...................................... 525/58; 428/412; 428/423.5; 428/480; 428/500; 428/516; 428/518; 525/92; 525/127; 525/154; 525/420; 525/437; 525/456; 525/465; 525/515
[58] Field of Search ............ 428/220, 423, 425, 474.4, 428/480, 411, 500, 516, 518; 525/903, 931, 932, 933

[56] References Cited

U.S. PATENT DOCUMENTS

| 3,798,115 | 3/1974 | Hofmann et al. | 428/474.4 X |
| 3,961,122 | 6/1976 | Gaines et al. | 428/220 |
| 4,021,415 | 5/1977 | Chang | 428/474.4 X |
| 4,042,750 | 8/1977 | Hanson et al. | 428/474.4 X |
| 4,087,481 | 5/1978 | Onder | 428/474.4 X |

Primary Examiner—Thomas J. Herbert, Jr.
Attorney, Agent, or Firm—Sughrue, Rothwell, Mion, Zinn and Macpeak

[57] ABSTRACT

A polymer composite material which comprises a first rigid polymeric material composed substantially of rigid molecular chains having an average chain length of 50 Å or more, and a second polymeric material composed substantially of flexible molecular chains, wherein said first rigid polymeric material is present in an amount of 20% or less based on the total weight of polymeric material in said composite and said first material is uniformly dispersed in said second polymeric material in a microscopic region of 1 μm or less.

19 Claims, 1 Drawing Figure

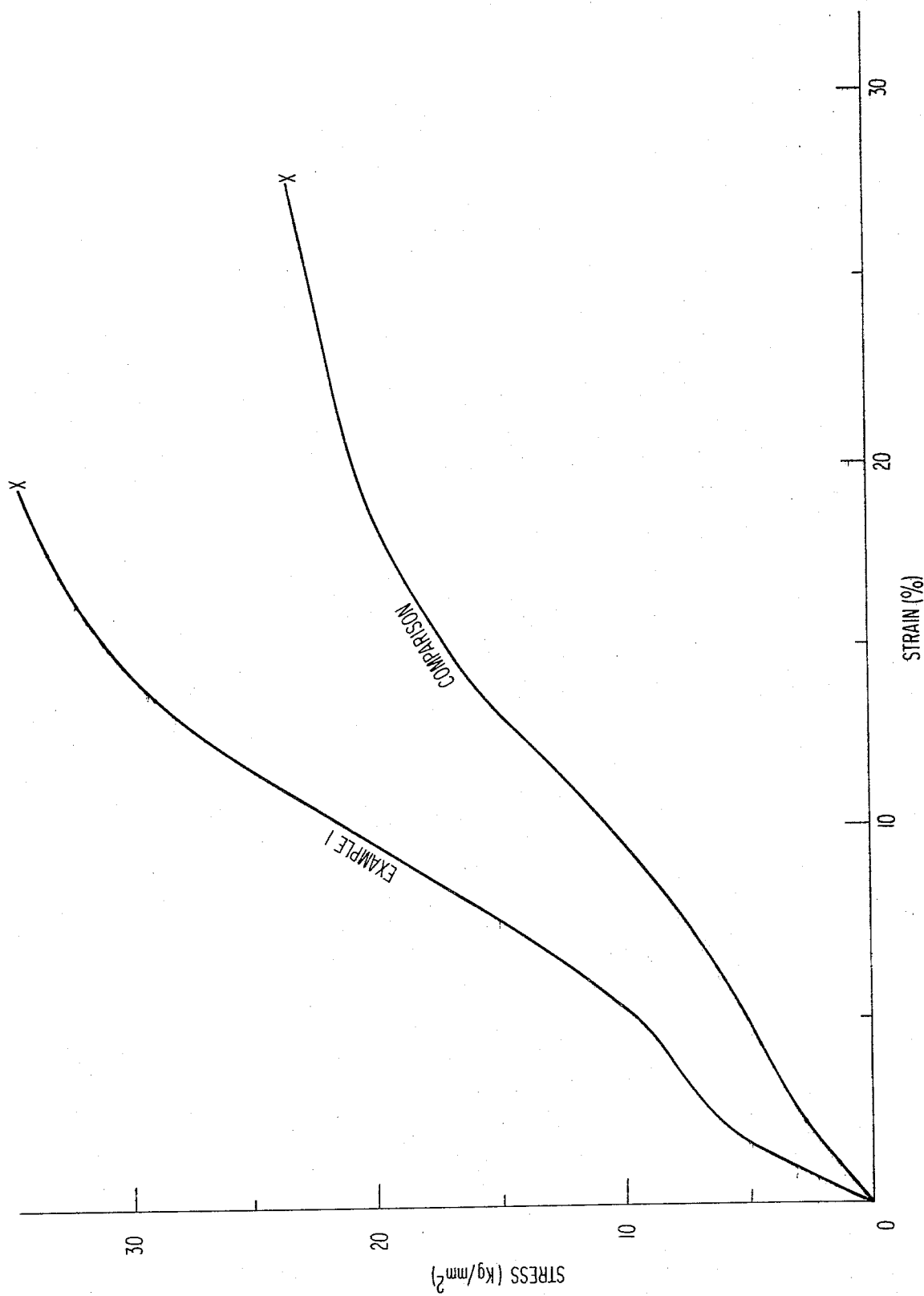

POLYMER COMPOSITE MATERIAL

BACKGROUND OF THE INVENTION

1. Field of the Invention

The present invention relates to a novel polymer composite material.

2. Discussion of the Prior Art

Generally, properties of polymer essentially depend on the properties of their chemical structure. For example, the bond energy between atoms making up the main chain, the thermal restriction on free rotation of these bonds, the dipole polarizability, the symmetry of the molecular structure, the electron density of the main chain and pendant groups and the steric structure of the molecule, etc., contribute to the overall properties of the polymeric material. Subsequently, the practical properties of molded polymeric materials can be revealed through their forming process as a whole mass of individual polymer chains. Accordingly, many well known polymeric materials have been used before in various kinds of compounded or composite forms in order to overcome limitations in their own properties for practical use. For example, rubber compounded impact resistant polystyrene, carbon black filled rubber, unsaturated polyester reinforced with glass fibers, polyethylene terephthalate reinforced with glass fibers and polypropylene compounded with calcium carbonate, etc., have been used effectively together with many homopolymers and copolymers in order to satisfy requirements in the market.

Particularly, various kinds of fiber-reinforced plastics have attained prominence because of the remarkably improved properties thereof and been used. However, there are some disadvantages in the use of glass fiber-reinforced plastics. That is, a large amount of fiber, generally a minimum of 30% by weight, is necessary for reinforcement, because of its low reinforcing effect; there is a limit on the effective fiber length and macroscopically long fiber length is required with due regard to breaking or destruction of the fiber during the molding processing. In the thermoplastic application, the above-described macroscopic heterogeneous composite materials have been recognized to be less processable. As a result, the shape of moldings are limited to a simple block or sheet. Films or filaments could not be formed from these glass fiber-reinforced plastics. The other disadvantages are a poor surface property of molded materials, an anisotropy in dynamic properties of moldings, molding defects due to heterogeneity of compounds, and low cycle time of processing.

SUMMARY OF THE INVENTION

As the result of extensive studies on the reinforcement mechanism of various polymer composite materials, a novel composite material has been found which is not expected from the above-described macroscopically reinforced plastics, and many of the disadvantages of prior art reinforced plastics have been overcome.

That is, the present invention provides a technique for improving the mechanical and physical properties of polymeric materials, for example, the breaking strength, yield stress, tensile modulus, heat resistance, dimensional stability, impact strength, flexural strength, folding resistance, tearing strength and fatigue property, etc., using a substantially small amount of a rigid polymer reinforcing agent without damaging the inherent molding properties (such as its film-forming property, spinning ability, sheet-extruding property, roll molding property or injection molding property, etc.) of the polymeric material matrix.

Characteristic of the present invention is the use of a rigid polymer, which is specially selected as a reinforcing material, and a dispersed state of the rigid polymer in a matrix polymer to be reinforced.

As a result of analyzing and examining various composite materials on the basis of the past studies and new theoretical considerations, it has been found that, when molecular chains of the reinforcing material have a certain rigidity, various mechanical and physical properties can be surprisingly improved by adding a small amount of the reinforcing material to the matrix polymer without deteriorating the processing property, if the reinforcing material is uniformly and microscopically dispersed in the matrix material to be reinforced. Thus, a novel type of polymer composite material which has not been known hitherto can be obtained.

BRIEF DESCRIPTION OF DRAWING

The drawing shows a stress-strain curve of the polymer composite material of the present invention in Example 1 and that of matrix polymer for comparison.

DETAILED DESCRIPTION OF THE INVENTION

In more detail, though the rigidity of the polymeric reinforcing material is a primary characteristic of the present invention, it cannot be easily defined at the present level of the macromolecular science. However, various parameters have been proposed in the art as indications of rigidity and straightness of a polymeric chain. One such indicator is the Mark-Houwink index ($\alpha$), which is defined by formula (1):

$$[\eta] = KM^\alpha \qquad (1)$$

wherein $[\eta]$ is the limited viscosity number, M is molecular weight and K is constant.

In this case, though ($\alpha$) depends somewhat on the measurement condition, if it exceeds 1.0, the polymer is regarded as having a rigidity suitable for the present invention through the result of various studies.

A second indicator for rigidity is the conformation parameter ($\sigma$). The conformation parameter ($\sigma$) is an inherent parameter of the macromolecule, which is defined by formula (2):

$$\sigma = <r_o^2>^{\frac{1}{2}} / <r_{of}^2>^{\frac{1}{2}} \qquad (2)$$

wherein $<r_o^2>$ is the unperturbed mean-square end-to-end distance of the molecule; and $<r_{of}^2>$ is the mean-square end-to-end distance of the freely rotating chain which is a hypothetical state of the chain. In such state, the bond angle restrictions are retained, but the steric hindrances to internal rotation are released.

Also, it has been found in the present invention that polymeric reinforcing material is suitable when the conformation parameter ($\sigma$) is more than 3.

The conformation parameter and the Mark-Houwink parameter are defined in more detail in *Polymer Handbook*, 2nd Ed., Brandrup, J., Immergut, E. H., page IV-1, John Wiley & Sons, N.Y. (1975).

Examples of the ($\alpha$) and ($\sigma$) of various polymeric materials are shown in Table 1.

TABLE 1

Conformation Parameter ($\sigma$) and Mark-Houwink Index ($\alpha$) of Various Polymeric Materials (1)

| Polymeric Material | $\sigma$ | $\alpha$ |
|---|---|---|
| Poly(styrene) | 2.2 | 0.7 |
| Poly(ethylene terephthalate) | 1.4 | 0.8 |
| 6,6-Nylon | 2.1 | 0.72 |
| 6-Nylon | 1.8 | 0.7 |
| Poly(acrylonitrile) | 2.6 | 0.75 |
| Poly(methyl methacrylate) | 2.0 | 0.76 |
| Poly(p-phenylene terephthalamide) | 3.2** | 1.09* |
| Poly(p-benzamide) | — | 1.5* |
| N-Butyl-nylon-1 | — | 1.18 |
| Poly(terephthaloyl-p-aminobenzhydrazide) | — | 1.1 |

*M. Arpin, C. Strazielle; Polymer, 18, 591 (1977)
**Presumption from K value
(1) Polymer Handbook J. Brandup/E.H. Immergut Interscience A further method of evaluating the rigidity of polymeric chains is also useful. Polymers having a molecular structure in which bending of main chain is restricted by the interaction between side chain atoms in the conformational analysis or a molecular structure of only a straight form or an analogous form (for example, polymers, such as poly(p-phenylene) which are rigid even though $\sigma$ should be unity) are suitable rigid materials in the present invention. The above-described values concerning the rigidity or straightness of polymer chains are one standard, but they cannot be used blindly to determine suitably rigid materials in view of the present level of macromolecular science.

The effect of compositing in the present invention depends upon the relative rigidity of the matrix material to be reinforced and the reinforcing material, and it is believed that the effect becomes more remarkable as the difference in the rigidity of the reinforcing material and the matrix material increases. However, it should also be noticed that the effects of the invention are also determined by the state of dispersion of the reinforcing material which leads to the second characteristic of the present invention.

In the present invention, examples of the rigid polymeric materials include straight chain aromatic polyamides and derivatives thereof such as poly(p-phenylene terephthalamide), copolymers prepared by substituting a portion of poly(p-phenylene terephthalamide) with aromatic residues such as 2,6-naphthalene or p,p'-biphenyl and poly(p-benzamide) and its derivatives, etc.; poly(terephthaloyl-p-aminobenzoylhydrazide), etc.; aromatic polyesters such as polyesters prepared from halogenated hydroquinone or methylhydroquinone and terephthalic acid or copolymers with 2,6-dihydroxynaphthalene, etc.; polyaromatic compounds such as poly(p-phenylene), etc.; poly(spiro-2,4-hepta-4,6-diene) and hydrogenated derivatives thereof; aromatic poly-Schiff bases such as polyimines prepared from 2-methyl-p-phenylenediamine and terephthalaldehyde and copolymers thereof, etc.; and N-substituted nylon-1, etc. It is advantageous from the viewpoint of uniformly dispersing the rigid polymer to reduce the crystallinity of the rigid polymer by copolymerization unless such damages substantially the inherent rigidity.

As described hereinafter, these rigid polymers in the present invention are often used as graft type or block type polymers wherein polymeric chains composing the matrix material are attached to the rigid polymer. Modification of the rigid polymer is conducted in order to hold the rigid molecule in a dispersed state in the matrix material. Alternatively, rigid materials modified by incorporating a third polymeric chain for the same purpose can be used.

A further important point of the rigid reinforcing material is the average length of the molecular chains thereof. Namely, based on analogy to fiber reinforcement, it would be believed that it was necessary that the chain length of the corresponding rigid material be sufficiently large. Nevertheless, as the result of various studies on this point, it has been unexpectedly recognized that a sufficient effect is obtained even if the average chain length of the rigid part in said rigid material is 50Å or more, by which it can be understood that application range of the present invention is very vast. The chain length of rigid polymer can be estimated by following method: calculation from number average molecular weight considering the information of conformation parameter, calculation from light scattering measurement, and from molecular structure model with molecular weight information. Of course, the reinforcing effect becomes more effective as the average chain length of the rigid polymer increases and a suitable average chain length can be selected according to the effect which is desired.

The rigid reinforcing polymer or the above-described modified rigid polymer is dispersed in the matrix polymeric material in a microscopic region of 1 $\mu$m or less in a uniform state, which is the second characteristic of the present invention. Molecular level dispersion is the most preferred state. Further, though some degree of aggregation or oriented parts of rigid molecules may be present, the rigid material will be regarded as uniformly dispersed if the following circumstances are met.

By the term "in the microscopic region of 1 $\mu$m or less" in this specification is meant that the presence of a phase composed of the rigid material itself it not be observed as an independent phase having a volume of 1 $\mu$m$^3$ or more by an optical microscope such as a polarization microscope or a phase contrast microscope. Of course, the present composite material has the same average distribution of the rigid component in $\mu$m dimension.

The amount of the rigid material as the reinforcing agent used in the present invention is small, which is the characteristic of the present invention, and suitable results can be obtained when the reinforcing material is present in the amount of 20% or less based on the weight of the whole resins, preferably the reinforcing agent is present in an amount of 3 to 10% by weight.

The polymeric material to be reinforced in the present invention is generally a flexible polymeric material having a conformation parameter of 3 or less and preferably 2.9 or less and a Mark-Houwink index of 0.9 or less, examples of which include polyacrylonitrile and copolymers thereof, polyamides and derivatives thereof, such as nylons 6, 66, 610 and 12, etc., polyesters and derivatives thereof, such as polyethylene terephthalate, polybutylene terephthtalate, polyethylene terephthalate-polybutylene terephthalate block copolymer, polyethylene terephthalate-polytetramethylene glycol block copolymer or polyethylene terephthalate-polyethylene glycol block copolymer, etc., polyurethanes, segmented polyurethanes, polyolefins and derivatives thereof such as polyethylene, polypropylene, polybutene or ethylenepropylene copolymer, etc., engineering plastics such as polycarbonates, polyacetals or polysulfones, etc., polyvinyl chloride and copolymers thereof, polyvinylidene chloride and derivatives thereof, polymethyl methacrylates, acrylate copolymer elastic materials, polystyrene and copolymers thereof such as polystyrene, acrylonitrile-styrene copolymer or acrylonitrile-styrene-butadiene copolymer, etc., polyvinyl acetates, polyvinyl formal, polyvinyl acetal, polyvinyl butyral, ethylene-vinyl acetate copolymers, ethylene-acrylate copolymers and hydrolyzed products thereof, polyvinyl alcohols and styrene-butadiene block copolymers, etc. Generally, the flexible polymer has a molecular weight of greater than 8,000.

The rigid polymeric reinforcing agent is uniformly dispersed in the flexible matrix polymers which is the second characteristic of the present invention. It is well known in the field of macromolecular science that the compatibility of high molecular materials with one another is generally very poor. In fact, though mixing or compounding has been successful with many practical polymeric compound materials as the result of many technical advances, the greater part of the studies has concentrated on improvement of interfacial compatibility of macroscopic compound materials. Here, efforts have been concentrated on a microscopically uniform dispersion of the rigid material in the matrix polymeric material to be reinforced. However, as a result of studies on the dispersion of the rigid material in the matrix polymeric material, it has been understood that mutual dispersibility of certain combinations of polymeric materials is not unexpectedly low and that the chain length of the rigid material affects their mutual dispersibility. On the other hand, as described above, in the present invention, an improvement is shown even with a polymer having a comparatively short chain length. Using such short chain materials, it is possible to carry out microscopically uniform dispersion by mere physical mixing in several combinations of rigid molecules and matrix polymers, and also the effect of reinforcement thereof can be observed.

The method of physical dispersion can be sufficiently carried out by the following means which are used conventionally. For example, it is possible to use a method which comprises mixing in a solution state and processing the resulting solution by a wet method or a dry method to form filaments or films. Also, a method which comprises removing a solvent from the compounded material and molding it or a method which comprises blending in a dry state and molding, is recommended. It is of course possible to use plasticizers in order to obtain more excellent dispersion or processability.

The above methods of physically mixing can be applied to not only the rigid materials but also modified rigid materials in which polymeric chains of the matrix polymer or chains of a third polymeric material are linked in the form of graft or block type polymers in order to improve the dispersibility.

Using block of graft polymers to improve the dispersibility of the rigid material, it is possible to use not only the above-described mixing method but also a method which comprising introducing the rigid material in a polymerization step together with a monomer substantially corresponding to the matrix polymeric material in the presence of absence of the matrix; or a method which comprises introducing the rigid material in the polymerization step together with a monomer corresponding to a third polymeric material in the presence of the matrix.

The characteristics of the polymeric composite material obtained by the process of the present invention are that the rigid reinforcing material is microscopically and uniformly dispersed in a flexible matrix and the amount thereof is comparatively small, which is different from the case of the prior macroscopic fiber-reinforced composite materials. Accordingly, the processing property of the polymer composite material of this invention is excellent and it becomes possible to form filament or film or to carry out uniaxial or biaxial stretching of sheet products, which is difficult with previous macroscopic fiber-reinforced composite materials. And the polymer composite material of the present invention is peculiar because it has good processing properties such as injection molding property or extrusion molding property and moldings thereof have smooth surface property. Particularly, in stretching materials, the rigid polymeric reinforcing material is oriented in a stretching direction to form a reinforced matrix having excellent properties, if a certain method is carried out. The peculiar effects of the present invention will be understood more clearly from the following explanation.

The first characteristic of the present invention is to use a rigid polymeric reinforcing material, which means that a rigid molecule is utilized to transfer stress to the flexible matrix molecule. In other words, since the rigid molecule itself has no structural defect which occurs naturally in the fiber spun thereof, strength or modulus of elasticity near the ideal value of the molecule can be held in the lengthwise direction of the molecule.

Concerning the rigid material being microscopically uniformly dispersed, which is the second characteristic of this invention, it can be understood that as the degree of dispersion of the molecules becomes high, the number of molecules effective for reinforcing increases. And the relative interfacial area along the rigid molecule increases remarkably as the degree of dispersion increases, so that rigid materials having comparatively short chain length are effectively used. The reinforcing effect can be enhanced, because breaking of molecule chain subjected to thermal activation and dynamic stress are limited to only said molecule to prevent transfer of stress to the others.

As described above, the present invention relates to a peculiar polymer composite material in which properties of polymers are skillfully utilized with the new idea, which has a very high industrial value.

The present invention is now illustrated with reference to the following examples. However, the present invention is not limited to them.

EXAMPLE 1

After 0.12 g of poly(p-phenylene terephthalamide) having a weight average molecular weight of 29,000 was dissolved in 100 ml of concentrated sulfuric acid, 3.88 g of nylon 6 was added thereto. The resultant transparent dope was added to an excess amount of pure water with vigorously stirring. The resultant precipitate was sufficiently washed with cold and hot water and dried in a vacuum at 100° C. The resultant sample was subjected to a hot press at 230° C. under 100 kg/cm$^2$ to prepare a film molding by conventional method. This sample was stretched 3 times at 170° C. to obtain a strip for measuring properties. The resultant stretched film was homogeneous and transparent, had a tensile strength of 35 kg/mm$^2$ (increase of 52%) and tensile modulus of 335 kg/mm$^2$ (increase of 184%). For comparison, a stretched film obtained by processing nylon 6 which did not contain poly(p-phenylene terephthalamide) in the same manner had a tensile strength of 23 kg/mm$^2$ and a tensile modulus of 118 kg/mm$^2$. A stress-strain curve is shown in the drawing together with that of the comparison sample.

Determination of the stress-strain curve was carried out by stretching the sample (interval of gauge: 3 cm) at 5 mm/min at a room temperature. The number average chain length of poly(p-phenylene terephthalamide) used in this example was calculated to be about 840 Å.

When melt spinning was carried out with using the sample of this example, the same effect was recognized.

EXAMPLE 2

A sample composed of 5 parts of poly(p-phenylene terephthalamide) having a weight average molecular weight of about 2,200 and 95 parts of nylon 6 was subjected to a hot press at 230° C. under 100 kg/cm$^2$ by the conventional method and the resultant film was cooled rapidly with cold water. When a tensile test was carried out, the sample had a yield strength of 4.1 kg/mm$^2$ (increase of 67%) and an initial tensile modulus of 154 kg/mm$^2$ (increase of 69%), while the comparison sample (which did not contain the reinforcing material) had a yield strength of 2.45 kg/mm$^2$ and an initial tensile modulus of 91.1 kg/mm$^2$. The film of this example was homogeneous and transparent, and the number average chain length of the rigid material was about 60 Å.

EXAMPLE 3

0.451 g of p-phenylenediamine was dissolved in a mixture of 40 ml of hexamethylphosphortriamide containing 2.0 g of lithium chloride and 20 ml of N-methylpyrrolidone, and 0.92 g of terephthaloyl chloride was added thereto with cooling by ice to carry out reaction. The reactipn proceeded quantitatively, and the resultant poly(p-phenylene terephthalamide) had 11,000 of the weight average molecular weight and about 330 Å of the number average chain length.

In this example, the above-described resultant rigid polymeric material was processed in the polymerization step of nylon 66, in a reaction active state without separating it. Namely, 1.621 g of adipoyl chloride was added to the reaction system and the polymerization reaction was continued by adding 1.13 g of hexamethylenediamine together with 5 ml of triethylamine. The copolymer was separated and purified by a conventional method to obtain a yield of 3.6 g. As the result of analysis, it contained 29% by weight of poly(p-phenylene terephthalamide). Further, homopolymer as the rigid component was not detected by a fractional test. This block copolymer was mixed with nylon 66 in the same manner as in Example 1 so as to contain 5% by weight of the rigid component. A transparent film was obtained by a conventional hot-press-quenching method. The tensile strength was 5.3 kg/mm$^2$ (increase of 39%) and the tensile modulus was 63.8 kg/mm$^2$ (increase of 74%). A sample composed of nylon 66 for comparison had a tensile strength of 3.8 kg/mm$^2$ and tensile modulus of 36.7 kg/mm$^2$.

EXAMPLE 4

3 parts of copolyester obtained from dimethyl terephthalate and a 7:3 (molar ratio) mixture of o-chlorohydroquinone and 2,6-dihydroxynaphthalene as the rigid material (number average molecular weight: 12,400, average chain length: 560 Å, $\sigma$: 4.9) and 97 parts of poly(ethylene terephthalate) were mixed with p-chlorophenol as a solvent, and a film was produced by wet-casting. The film was biaxially stretched 3×3 times at 100° C. to obtain a sample.

The sample had a tensile strength of 20.1 kg/mm$^2$ (16.2) (increase of 24%), tensile modulus of 420 kg/mm$^2$ (253) (increase of 66%), a yield strength of 13.6 kg (9.0) (increase of 51%) and elongation of 70% (130). The comparison value is in the parentheses.

EXAMPLE 5

0.4 g of a polyamidehydrazide synthesized from p-aminobenzoylhydrazide and terephthaloyl chloride (weight average molecular weight: 12,000, number average chain length: 340 Å, $\alpha = 1.1$) was dissolved in 30 ml of dimethylsulfoxide. To the solution, 4.2 g of styrene and 1.8 g of acrylonitrile were added, and polymerization was carried out with using benzoyl peroxide as a polymerization initiator. When the polymer was separated with using tetrahydrofuran, a graft-copolymer in which 74% by weight of styrene-acrylonitrile was grafted to polyamidehydrazide was obtained. After 9 parts of this rigid polymer containing graft-copolymer were dissolved in dimethylsulfoxide, 91 parts of ABS resin (rubber content: 12%) were mixed to obtain a sufficient dispersed state. Then a film was prepared. Properties of the film were as follows. The value described in the parentheses is a comparison value.

Tensile strength: 620 kg/cm$^2$ (450 kg/cm$^2$) and tensile strength at 100° C.: 75.2 kg/cm$^2$ (1 kg/cm$^2$).

EXAMPLE 6

In an AB type block copolymer prepared as the rigid material wherein the terminal amino group of poly(capramide) linked to the terminal carboxyl group of poly(p-benzamide), the weight average molecular weight of poly(p-benzamide) before linking was about 3,800 and the number average chain length thereof was about 105 Å. The poly(capramide) content in this block copolymer was about 68% by weight. To this block copolymer, nylon 6 was added in the same manner as described above in a weight ratio of 3:97 by which a polymer composite material containing 1% of poly(p-benzamide) as the rigid material was obtained. A film obtained by a hot press-quenching method at 230° C. had the following properties. The value described in the parentheses means a comparison value.

Yield strength: 5.1 kg/mm$^2$ (2.5) (increase of 104%) and tensile modulus: 152 kg/mm$^2$ (92) (increase of 65%).

EXAMPLE 7

3 parts of copoly(p-phenylene/(2-methyl, 5-isopropyl)-p-phenylene) (content of (2-methyl, 5-isopropyl)-p-phenylene: 43%; number average molecular weight: 3,200; number average rigid chain length: about 150 Å) obtained by Fittig reaction of 1,4-dibromobenzene and 2,5-dibromo-p-cymene was dissolved in 1,500 parts of xylene. After 97 parts of high-pressure polyethylene (specific gravity: 0.915; melt index: 20) was added and dissolved in the resulting solution at 75° C., xylene was removed with reducing pressure to obtain a residue, and xylene contained in the residue was further removed under vacuum condition with heating. The thus-obtained material was subjected to press-molding to prepare a dumb-bell test specimen having a thickness of 2 mm. The dumb-bell test specimen had a yield strength of 115 kg/cm$^2$, a tensile modulus of 2,950 kg/cm$^2$, a break strength of 97 kg/cm$^2$ and an elongation of 540%. Further, the same results were obtained even when the above components were fused and mixed in dry process using an extruder.

For comparison purpose, the same procedures were repeated to obtain a test specimen except that copoly(p-phenylele/(2-methyl, 5-isopropyl)-p-phenylene) was not added. The test specimen had a yield strength of 85 kg/cm$^2$, a tensile modulus of 1,600 kg/cm$^2$, a break strength of 95 kg/cm$^2$ and an elongation of 600%.

EXAMPLE 8

In 170 parts of N,N'-dimethylacetamide was dissolved 3 parts of a partially cyanoethylated poly-p-phenyleneterephthalamide (presumed average chain length calculated in solution theory: 750 Å) produced by polycondensation of diamines (N,N'-dicyanoethyl-p-phenylenediamine, N-cyanoethyl-p-phenylenediamine and p-phenylenediamine (molar ratio: 15:25:60) with a substantially equimolar amount of terephthaloyl chloride. A solution of 97 parts of polyacrylonitrile in 800 parts of N,N'-dimethylacetamide was mixed with the thus-obtained solution to prepare a spinnable dope. The dope was subjected to spinning through a spinneret in a warm water containing N,N'-dimethylacetamide and to stretching 7.5 times longer to prepare a test specimen. After sufficient removal of solvent and drying of the test specimen, tensile test was conducted. A tensile strength, elongation and a tensile modulus were 4.8 g/d, 26% and 740 g/d, respectively.

For comparison purpose, the same procedures were repeated to prepare a test specimen except poly-p-phenyleneterephthalamide was not added. The thus-prepared test specimen had a tensile strength of 3.8 g/d, an elongation of 27.3% and a tensile modulus of 573 g/d.

While the invention has been described in detail and with reference to specific embodiments thereof, it will be apparent to one skilled in the art that various changes and modifications can be made therein without departing from the spirit and scope thereof.

What is claimed is:

1. A polymer composite material which comprises a first rigid polymeric material composed substantially of rigid molecular chains having an average chain length of 50 Å or more, and comprising at least one member selected from the group consisting of poly(p-phenylene terephthalamide); copolymers prepared by substituting a portion of the poly(p-phenylene terephthalamide) with 2,6-naphthalene or p,p'-biphenyl, poly(p-benzamide); aromatic polyesters prepared from a halogenated hydroquinone, a methylhydroquinone or 2,6-dihydroxynaphthalene and terephthalic acid; aromatic poly-Schiff bases prepared from 2-methyl-p-phenylenediamine and terephthalaldehyde and copolymers thereof; N-substituted nylon-1; poly(-spiro-2,3-hepta-4,6-diene) and hydrogenated derivatives thereof; poly)terephthaloyl-p-amino-benzoyl-hydrazide; and polymers comprising a straight chain of poly-p-phenylene; and a flexible second polymeric material composed substantially of flexible molecular chains and comprising at least one member selected from the group consisting of polyacrylonitrile and copolymers thereof; nylons 6, 66, 610 and 12; polyethylene terephthalate; poly-butylene terephthalate; polyethylene terephthalate-polybutylene terephthalate block copolymer; polyethylene terephthalate-polytetramethylene glycol block copolymer; polyethylene terephthalate-polyethylene glycol block copolymer; polyurethane; segmented polyurethanes; polyethylene; polypropylene; polybutene; ethylene-propylene copolymer; polycarbonate; polyacetals; polysulfones; polyvinyl chloride and copolymers thereof; polyvinylidene chloride and derivatives thereof; polymethyl methacrylates; acrylate copolymer elastic materials; polystyrene; acrylonitrilestyrene copolymer; acrylonitrile-styrene-butadiene copolymer; polyvinyl acetates; polyvinyl formal; polyvinyl acetal; polyvinyl butyral; ethylene-vinyl acetate copolymers; ethyleneacrylate copolymers and hydrolyzed products thereof; polyvinyl alcohols; and styrene-butadiene block copolymers, wherein said first rigid polymeric material is present in an amount of 20% or less based on the total weight of polymeric material in said composite and said first material is uniformly dispersed in said second polymeric material in a microscopic region of 1 μm or less.

2. The polymeric composite material of claim 1, wherein said first rigid polymeric material has a Mark-Houwink index greater than unity. first rigid polymeric material is present in an amount of 20% or less based on the total weight of polymeric material in said composite and said first material is uniformly dispersed in said second polymeric material in a microscopic region of 1 μm or less.

3. The polymeric composite material of claim 1, wherein said first rigid polymeric material is an N-substituted nylon-1.

4. The polymeric composite material of claim 1, wherein said first rigid polymeric material is a poly(-spiro2,4-hepta-4,6-diene) and hydrogenated derivatives thereof.

5. The polymeric composite material of claim 1, wherein said first rigid polymeric material is poly(-terephthaloyl-p-amino benzoylhydrazide).

6. The polymeric composite material of claim 1, wherein said first rigid polymeric material is a poly-p-phenylene.

7. The polymeric composite material of claim 1, wherein said second flexible polymeric material has a Mark-Houwink index of 0.9 or less.

8. The polymeric composite material of claim 1, wherein said second flexible polymeric material has a molecular weight greater than 8,000.

9. The polymeric composite material of claim 1, wherein said second polymeric material is a member selected from the group consisting of polyacrylonitrile, polyvinyl chloride, polymethyl methacrylate, polystyrene, polyvinyl acetate, polyvinyl acetal, polyethylene, polypropylene, polybutene, and copolymers thereof.

10. The polymeric composition material of claim 1, wherein said second flexible polymeric material is a member selected from the group consisting of a polyurethane, a polycarbonate, a polyacetal, and a polysulfone.

11. The polymeric composite material of claim 1, wherein said second polymeric material comprises at least one member selected from the group consisting of polyacrylonitrile, polyvinyl chloride, polymethyl methacrylate, polystyrene, polyvinyl acetate, polyvinyl acetal, polyethylene, polypropylene, polybutene, polyurethane, polycarbonate, polyacetal, polysulfone and copolymers thereof.

12. The polymeric composite material of claim 1, wherein said first polymeric material is a straight chain aromatic polyamide having junction points at the p-position or derivatives thereof.

13. The polymeric composite material of claim 12 wherein said first rigid polymeric material is a poly(p-phenylene terephthalamide), a copolymer prepared by substituting a portion of poly(p-phenylene terephthalamide) with aromatic residues selected from the group consisting of 2,6-naphthalene and p,p'-biphenyl, or a poly-benzamide.

14. The polymeric composite material of claim 1, wherein said first rigid polymeric material is a straight chain aromatic polyester having junction points at the p-position or derivatives thereof.

15. The polymeric composite material of claim 14, wherein said aromatic polyester is a polyester prepared from terephthalic acid and a member selected from the group consisting of a halogenated hydroquinone, a methylhydroquinone and 2,6-dihydroxynaphthalene.

16. The polymeric composite material of claim 1, wherein said first rigid polymeric material is an aromatic poly-Schiff base having junction points in the p-position or derivatives thereof.

17. The polymeric composite material of claim 16, wherein said poly-Schiff base is a polyamide prepared from 2-methyl-p-phenylenediamine and terephthalaldehyde and copolymers thereof.

18. The polymeric composite material of claim 1, wherein said first rigid polymeric material is modified such that the rigid polymeric material can be maintained in a dispersed state in said second polymeric material.

19. The polymeric composite material of claim 18, wherein said first rigid polymeric material is modified such that the molecular chains of said second polymeric material are incorporated in said first rigid polymeric material as a graft-type or block-type polymer.

* * * * *